March 21, 1950 C. CHILOWSKY 2,500,929

MEANS FOR REPRODUCING TELEVISION IMAGES

Filed July 12, 1946 5 Sheets-Sheet 1

INVENTOR.
CONSTANTIN CHILOWSKY
BY
Brown & Seward
ATTORNEYS

March 21, 1950 C. CHILOWSKY 2,500,929

MEANS FOR REPRODUCING TELEVISION IMAGES

Filed July 12, 1946 5 Sheets-Sheet 2

INVENTOR.
CONSTANTIN CHILOWSKY
BY
Brown & Seward
ATTORNEYS

MEANS FOR REPRODUCING TELEVISION IMAGES

Filed July 12, 1946 5 Sheets-Sheet 3

INVENTOR.
CONSTANTIN CHILOWSKY
BY
Brown & Seward
ATTORNEYS

INVENTOR.
CONSTANTIN CHILOWSKY
BY
Brown & Seward
ATTORNEYS

March 21, 1950 C. CHILOWSKY 2,500,929

MEANS FOR REPRODUCING TELEVISION IMAGES

Filed July 12, 1946 5 Sheets-Sheet 5

INVENTOR.
CONSTANTIN CHILOWSKY
BY
Brown & Seward
ATTORNEYS

Patented Mar. 21, 1950 2,500,929

UNITED STATES PATENT OFFICE 2,500,929

MEANS FOR REPRODUCING TELEVISION IMAGES

Constantin Chilowsky, New York, N. Y.

Application July 12, 1946, Serial No. 682,992

5 Claims. (Cl. 178—7.5)

This invention relates to a method and means for intensification and amplification of vision and television images.

In my copending application, Patent 2,495,697 Jan. 31, 1950, I described a method of intensification and amplification of images in which an electronic image derived from a photocathode in a vacuum camera or from an electronic television image produced by the electronic beam in a television receiving tube, was intensified by means of a screen or "black filter" consisting of a plurality of minute light valve elements disseminated over a non-transparent screen but occupying a very small cross sectional area relative to the surface of the screen, these small light valve elements being controlled by electrons or electric impulses of the electrons projected on this screen from the photocathode of a vacuum chamber by the electronic beam of a television tube. A strong and conveniently concentrated light is projected through the valve system of the black filter reproducing with greatly increased brightness the initial image.

I have also described a method by which this plurality of electronic impulses or variations constituting potentially the picture to be reproduced and usually comprising, for instance, about 200,000 picture elements, can be transmitted and transposed, without disturbing the image, to another surface, outside the vacuum camera or television tube, the plane of the surface being orientable at will and much larger than, for instance, the initial frame of vision or television, and being situated at an appreciable distance from the vacuum camera if desired. The above mentioned black filter, of corresponding dimensions, applied to this transposed surface, can be operated by electronic impulses transmitted from the vision or television camera.

This transmission of a large number of electric impulses constituting an image is effected by a "body with linear electric conductivity," described in the above application, and consisting of an insulating material (for instance, glass or plastic) with a large number of fine separate conductive ducts or strands (formed preferably by thin metal deposits, or by thin metallic wires) incorporated in the mass, or in the thickness of this material, these ducts starting from one surface of the body and extending to another side.

This material is generally prepared, as described in the above application, from thin insulating sheets or foils, with a plurality of separated narrow ducts incorporated between the surfaces of each two consecutive laminae conveniently assembled together to form a compact body of any suitable shape (block, plate, cylindrical body, bar, etc.). Each body with linear conductivity generally contains a number of ducts at least equal to the number of picture elements of the image to be transmitted or transposed. It can be cut in pieces, or conveniently reassembled from the pieces.

The body with linear conductivity can also have divergent ducts, starting from a small section and expanding into a large section, thus making it possible to transmit a number of electric impulses from a small section to a large section either through a single body with continuous ducts or through a compound body consisting of several parts or pieces with conveniently adjusted surfaces or sections, the adjustment insuring the electric contact of corresponding ducts and the electric continuity of each duct.

The present invention makes use of such a body with linear conductivity for transmitting a plurality of electric impulses from a relatively small surface where they are generated to a generally greater surface where the reproduced image can be observed with increased brightness. However, such impulses are used not for control of light valves, as previously described, but rather for production and control of modulated light emission on a plurality of elements, or points of a special light emitting screen.

In particular, such current impulses are used for controlling a corresponding number of small electric currents of an electric amplification system, the amplified currents being used for producing a suitably modulated light at a corresponding plurality of points of an enlarged surface, thus reproducing on a new screen, point by point, the original image.

For this purpose is provided a flat "collective amplifier" formed substantially of two special glass plates placed against each other and securely joined together at their periphery and comprising between them a plurality of amplifying elements (i. e., a filament, grids and plate), the space between the plates being highly evacuated.

At least one of the plates consists of "glass with linear conductivity" and comprises therefore a plurality of conductive ducts traversing the thickness of the plate. Within the "collective amplifier" is a number of separate grids equal to the number of such ducts, each grid being in a contact with a duct. The plate is fixed on the surface of a body having ducts through which pass the electric impulses or variations derived from the image, in such a way that each separate electric impulse brought in by a separate duct is transmitted to a corresponding individual grid, and modulates in a suitable manner the current between the incandescent filament forming the cathode and an anode, applied to the inner surface of the external plate or near its inner surface.

In a preferred form of the invention, the light is produced within the collective amplifier itself, the modulated flux of electrons, emitted by an individual element of the incandescent filament, being projected with sufficiently high voltage on a small area of a material which is fluorescent under action of the electrons.

This area itself can form a semi-transparent anode, the fluorescent material being deposited, for instance, on a thin transparent metallic layer thus forming an anode. The layer of fluorescent material can be rendered slightly conductive by incorporation of appropriate materials. Or it can be slightly discontinuous permitting the secondary electrons to penetrate through these discontinuities toward the anode. Or the fluorescent layer may be deposited directly on glass, the elements of the anode being placed near this layer so as to direct the electrons thereon, the anode in this case being also capable of collecting the secondary electrons. Preferably the plates of the collective amplifier can be made of Pyrex glass.

A considerably intensified and enlarged reproduction of the original image is thus formed on a new screen and can be viewed from the outside through the outer glass plate of the collective amplifier. Or such image of great brilliancy can be projected by optical means on a large screen. The outer surface of the glass can be suitably polished to remove traces of the structure of the system.

Other modifications of the method are also provided in which the plurality of separate currents (called herein "micro-currents"), provided by the amplifier, are used for reproducing a luminous image in a second flat tube applied to the above described collective amplifier and filled with a gas rendered luminescent by the passage of the current or electric discharges transmitted by the amplifier.

In this case the second glass plate of the amplifier consists of glass with linear conductivity similar to the first, each conductor of the second plate being in contact with a separate small metallic area forming an anode "plate" of the amplifier. The flat tube with luminescent gas can be formed by a third glass plate attached to the edges of the second plate of the collective amplifier. The conductors of this second plate, terminating in the flat chamber with gas, form a plurality of electrodes, from which a plurality of amplified currents traverse the thickness of the gas layer, causing it to become luminescent, thereby reproducing the original image. The final anode can be carried, for instance, by the interior surface of the outer glass plate.

The layer of luminescent gas can consist of any gas, whether rarified or not, capable of becoming luminous under action of currents or electric discharges, and of a suitable color. Or gas or vapor will be used emitting short rays to activate a fluorescent material which can be deposited on the outer surface. Neon can be used, for instance, or any suitable luminescent gas, or mercury vapor, or a rapid intensive discharge in argon (or instance, in case of television), etc. The flat gas tube can also be provided on the inside walls with fine separating grids of an insulating material, thus separating the gas into as many micro-cells as there are conductors in the wall, and forming a spacer or support between the walls, or the inner surface of one or both walls can be shaped so as to form such cellular partitions of the gas layer.

The invention also provides that the flat gas tube can be applied directly and without intermediate multi-amplifier, on the surface of the body with linear conductivity which transmits impulses, these impulses directly producing local modulations of current of electric discharges of an independent source of current passing through the gaseous layer of the tube, perpendicularly to the surface of the plate.

It has been assumed that the body with the linear conductivity transmitting the impulses and electric variations consisted of thin laminations, each having on its surface a plurality of suitable conductors, often diverging, beginning at a small section in contact with a source of electric impulses, and abutting a surface, generally much greater, of the luminous reproduction. Since this body with linear conductivity must generally comprise for good reproduction as many as 100,000 to 200,000 conductors, it follows that in practice there is a limit for minimal linear dimensions of the small section, at which the manufacture is still relatively easy and below which it becomes difficult and, finally, practically impossible. This minimal dimension, for an image for instance of about 200,000 picture elements, can be calculated to be of the order of about 5 cm. in diameter or square, the thickness of the laminations being about 0.1 mm. and distance between ducts being about 0.1 mm.

For certain other applications, however, the invention provides different methods of construction of the body, making it possible to obtain, even for the same high number of conductors such as 200,000, much smaller minimal sections reaching, for instance, 1 or .5 cm. in diameter or square and which in certain cases can be still further reduced.

This result can be obtained, beginning, for instance, with bodies of much larger sections obtained by the lamination method, and progressively deforming the block under a very high pressure, preferably very slowly, and at a suitable temperature, permitting progressive plastic deformation without breaking the continuity of the material and of the metallic ducts. This original block is preferably made of a relatively large section, of a plastic material with sufficient but reduced ductility, or of a plastic material which acquires ductility by maintaining during operation a sufficiently high temperature, or a plastic material in a state of progressive polymerization during or after the operation.

The ducts are preferably made of metallic deposits or of fine wire of a very ductile metal or alloy. Ductility of the plastic material need be only sufficient to permit the metal conductors to stretch considerably without breaking. This is facilitated by the application of a very high pressure and by a very slow deformation.

It is provided that most of these deformations can be facilitated in submitting the respective body during this deformation to intense mechanical high frequency vibration of sonic, ultrasonic, or even higher frequencies, such application permitting specially to avoid rupture of the ducts. Preferably the oscillation will be in the direction of the ducts.

Under special conditions, it is possible to use any means for deformation, with suitable equipment, such as:

Slow progressive forcing of a block, for instance, cylindrical, into a receptacle, converging into a cone, so as to lengthen the block, and to reduce its thickness at one end to the small desired diameter. By working and drawing of one portion or almost entire block through successive drawing dies it can be made into a long thin conductor capable of transmitting electric impulses, and, consequently, television signals, at sufficiently large distances (for instance, between different rooms or portions of a house or building). Drawing of the block between two end surfaces, of equal or different diameters, can be effected in such a manner as to join the two initial surfaces by a long cable of vision. Twisting of the block or conductor, can be effected, for instance, for turning the reproduced image by 180° and for orienting the same as the original image.

By such a progressive, gradual and very slow deformation, it is possible to obtain almost any desired form of the intermediate body between the two end surfaces.

This method of progressive deformation of the body of linear conductivity, beginning with the two end surfaces where the conductors emerge, can be also applied to a body of linear conductivity whose dimensions are large and considerably exceed the limits of 5 to 10 cm. in the side. The application of this method can, for instance, permit considerably to reduce the thickness of large screen plates of a linearly conductive material, formed by oblique cutting of these plates, permitting to impart to the lower part of the plate, by its progressive deformation, a round or square section, adapted to serve as a section of a television tube. Or a continuous conductor of appreciable length between the two surfaces can be provided.

The deformation method can be also applied to bodies with linear conductivity made of glass, especially of reduced dimensions. In such a case a portion of a block between two sections or surfaces can be progressively deformed. "Pyrex" glass is especially recommended for this purpose.

The described formation of very fine conductors (of the order, for instance, of 1 cm. and under), beginning with a much larger section, can have, according to the invention, important applications some of which are indicated below.

For instance it is provided to equip a small section of the body with a photoelectric device, such as selenium, or caesium (described below) and with a small optical arrangement for projecting an image on a photoelectric layer. The variations or photoelectric impulses, transmitted to the large section, will permit reproducing the image by the described means on an enlarged scale.

Such a system can be utilized for constructing an "electric microscope," or "electro-optic microscope," in which the real image formed by the objective of the microscope is projected on a small sensitive surface, and a much enlarged and intensified image is rendered visible on a large screen.

The same arrangement can reproduce and enlarge with great brilliancy images observed through an ordinary optical spy glass, or astronomical telescope.

The arrangements can be very conveniently used for easily reading a microfilm on an enlarged screen, in broad daylight. (If desired, the largest section can be equipped with two or more collective amplifiers, connected in series.)

(It is to be noted that the described arrangement with a small section receiving an image and a large section reproducing the image on an enlarged scale and with brilliant illumination, has also considerable structural analogy with the human eye, comprising a pocket of the sensitive optical nerve and the optical nerve itself conducting to the brain.)

The arrangement, comprising a fine, sufficiently flexible cable for transmitting the "vision," equipped at the end with a small section for receiving the image (which can be called artificial eye), and at the other end, a large screen for luminous reproduction of the image, can have important application in medicine, the small artificial eye on its cable being easily introduced into different cavities of the human body, whose walls, lighted by a small lamp, connected with the arrangement, can be examined on a large screen.

Another medical application consists in the intensified reproduction of radioscopic images, permitting observation in daylight, with intensified contrasts between shadows and light.

Without mentioning in detail different applications for photography in poor light or at night, this system can be applied, for instance, to the examination of metals by X-rays, the radioscopic image of difficultly accessible objects, being transmitted at a distance for convenient observation. In general, the system can be used for control of any more or less penetrating radiation of radioactive bodies, either with the aid of fluoroscopic screens or by the direct action on a suitable sensitive layer.

It is to be noted that in many cases when fine details of the image are not important, it would be sufficient to divide the image into a much smaller number of elements than 200,000, with correspondingly smaller numbers of conductors in the body with linear conductivity and of elements in the collective amplifier. Thus, for instance, for medical observation of tissues lining cavities in the human body, only 10,000 elements will be sufficient. The system permits the use of a periscope for all applications.

The process can be applied to motion pictures and television for advertising purposes, transmitting images from a small section to a very large screen, with strong illumination visible in daylight, and not requiring any large amount of geometric space indispensable for the optical projection.

With the system, it is also possible to use the procedures mentioned in the foregoing copending patent application.

This invention will be better understood with the aid of the appended drawings submitted by way of an example and in which.

Figure 1:
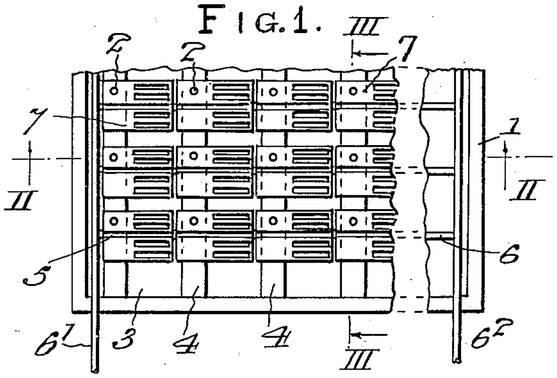
Fig. 1 represents a front elevation, on an enlarged scale of the glass plate with linear conductivity of the collective amplifier, parts being broken away.
Figure 3:
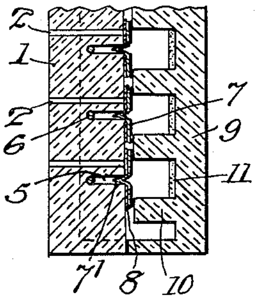
Fig. 3 represents a vertical section taken on the line III—III of Fig. 1, together with a section of the second plate shown in Fig. 2.

Referring to the drawings,

Fig. 1 is a front view on an enlarged scale of the glass plate with linear conductivity of the collective amplifier. In this figure, 1 is a glass plate, 2 are ducts traversing the thickness of the plate and emerging inside the amplifier. These ducts transmit electric impulses. The surface of the plate is provided with cut or molded parallel longitudinal cavities 3, which are separated by longitudinal glass projections or ridges 4. The plate is so shaped that the projections 4 contain the ends of the ducts 2. The projections are provided with fine transverse grooves 5 extending through a portion of their height, and 6 are metal wires placed in the grooves 5 and fixed, for instance, near the bottoms of the grooves. They are connected in parallel at two opposite edges of the plate to two collectors $6'$, and $6^2$, passing to the outside through the edges of the glass plates. They are heated in parallel. 7 are metal grids in contact with the ends 2 of the ducts and consist of a foil bent in the center, the bent portion being inserted in the slot 5 as shown in Fig. 3. This foil has also two (or more) fine branches of control. The grids originally formed as parts of a long continuous band, are preferably cut apart after being fixed. The margin 4 adjacent the grid is metallized for insuring contact with the conductor 2.

Figure 2:
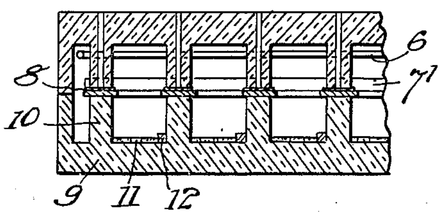
Fig. 2 represents a horizontal section, taken on the line II—II of Fig. 1, together with a section of the second plate of the amplifier.

Figs. 2 and 3 show respectively horizontal and vertical sections through the parts just described, including a metallic layer 8 deposited on the ridges 4 adjacent the grids and in a contact with the end 2 of the conductor. 7' is a folded part of a grid, placed in the groove 5. In these figures a second plate 9 has been added and the projections or ridges 10 of the plate 9 lie in positions corresponding to the projections 4; 11 are layers of a fluorescent material covering the inner surface of the plate 9 (except the projections 10), receiving the electrons from the filament 6 and reproducing the image so as to be visible through the plate 9; 12 is an element of a fine metal grid covering the bottom of the plate 9, and forming a common anode collecting the electrons (principally secondary electrons). The filaments can be of thoriated tungsten or of wires covered by oxides.

Figure 4:
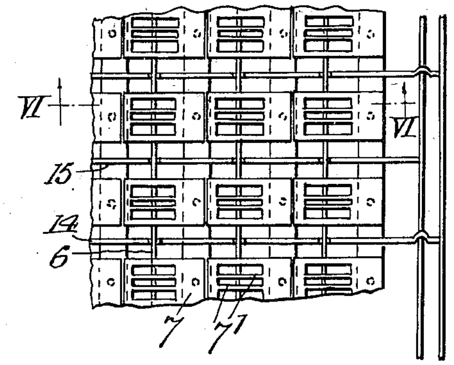
Fig. 4 represents a front elevation, corresponding to Fig. 1 of a modified form of plate.
Figure 5:
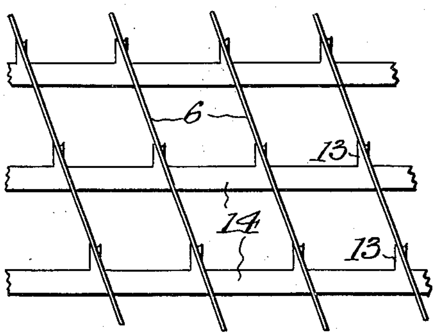
Fig. 5 represents a detail perspective view of certain bands and filaments.
Figure 6:
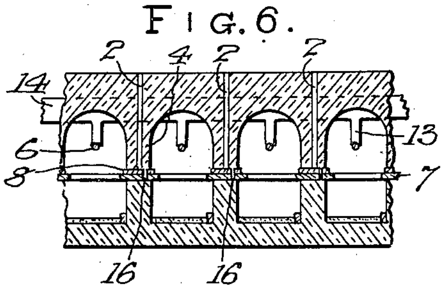
Fig. 6 represents a horizontal section, taken on the line VI—VI of Fig. 4, together with a section of the second plate, as in Fig. 2.

Figs. 4, 5 and 6 relate to an important modification. The filaments 6 are placed along the cavities 3 and are supported by projections 13 of thin metal bands 14 fixed in the grooves 15 made in the projections or ridges 4, and extending across these projections. The bands 14 lie at right angles to the filaments 6 which they support.

The grid branches or wires 7' can be made as narrow as desirable, and in suitable number. For small amplifier elements one branch, for instance formed by the bend of the foil, may be sufficient. In many cases particularly when small amplifier elements are used, it is possible to suppress completely the grid 7—7', and to use as grid simply the metallized portion 8 in contact with the ducts 2. It is possible, by making the channel 3 sufficiently narrow, and the grooves 5 sufficiently deep, to place the filament 6 in such position that the electric charges of the metallized area 8 (Figs. 2 and 3) will sufficiently control the electronic current between the filament and the anode, particularly if the metallic layer 8 is extended slightly around one or both lateral surfaces of the projection 4. Moreover, when the electric impulses come from a television tube, relatively high variations of the grid potential can be used, facilitating such simplified control of the electronic current.

In Fig. 6 the band 14 is shown with its projections 13 supporting the filaments 6. 8 is the metallized layer on the projections 4; 7 are bands forming grids fixed on the metallic layer 8, by soldering, for instance. After soldering, the soldered bands 7 and metallic layers 8 are cut by fine sawcuts 16 at the right side of the point of emergence of the conductors 6 so that each piece of the cut band rests in contact with a single duct.

Figure 7:
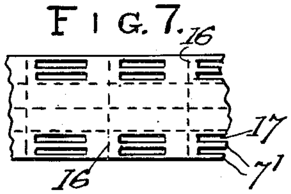
Fig. 7 represents a face view of a small section of the band from which the grids are formed.

Fig. 7 shows a band forming the grids before it is cut into separate portions. The sawcut 16 is shown in dotted lines. 17 are openings in the band, spacing the fine branches 7' of the grid.

Figure 7A:
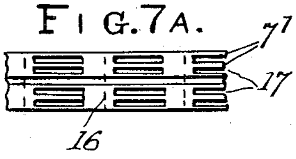
Fig. 7A represents a similar view of the band folded to the form shown in Figs. 1, 2 and 3.

Fig. 7A shows the strip bent or folded to the form in which it is used in Figs. 1, 2 and 3.

The heating of the filaments 6 can be preferably effected by a special method according to which a higher voltage for heating is periodically applied to two collecting conductors 6′ and $6^2$ (Fig. 1) at a sufficiently high frequency, and only during a fraction (for instance, ¼ to $\frac{1}{10}$) of the total cycle. During this fraction of the period when the heating current is applied, high voltage between the filament and the plate is suppressed and the television beam and picture formation are stopped. Then this high voltage (between the filament and the plate) is reestablished for longer fractions of the time during which the heating voltage is suppressed. The frequency will be selected sufficiently high as to insure sufficiently small temperature variations of the filament. The selected frequency should be sufficient for varying the filament temperature within acceptable limits. Thus the variation of the heating voltage along the filaments cannot effect the modulating action of the grids.

The filaments in Fig. 4 can be heated by the same means. But as shown in Fig. 4, heating of the small ends of the filaments can be effected in parallel by an ordinary method across the bands 14, all even bands being joined, for instance, at one pole, and all odd bands at the other, as indicated at the right of Fig. 4, the heated filament parts being too short for causing an appreciable difference in voltage. When the amplifier elements are sufficiently large the filament heating can be effected by the usual means of a central wire surrounded by a concentric electron-emitting tube.

Figure 8:
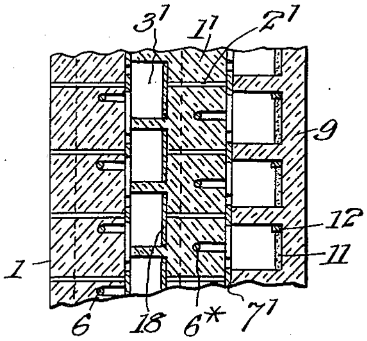
Fig. 8 represents a vertical section of a multiple-plate collective amplifier.

Fig. 8 shows an arrangement with two (or more) collective amplifiers, including the plate 1 of Fig. 3, an intermediate plate 1′ forming an element of the second amplifier. This plate is placed between the plate 1 and plate 9. The plate 1′ of glass (for instance "Pyrex") with linear conductivity. It has on its side, opposite plate 1, longitudinal cavities 3′. Ducts 2′ of the plate 1′, terminating at the bottom of the longitudinal cavities, are in a contact with small metal areas 18 deposited at the bottom of the cavities 3′. The areas 18 are insulated from each other and each is in a contact with a duct 2′. At the other end, the ducts 2′ terminate in contact with grid pieces 7′.

Areas 18 form a plurality of separate anodes. They receive the modulated stream of electrons coming from the filaments 6 and transmit them through ducts 2′ to the grids 7′ of the second amplifier. The grids 7′ modulate the current passing between the filaments 6* of the second amplifier and anode 12 of the plate 9, causing the phosphor layer 11 to fluoresce.

Figure 9:
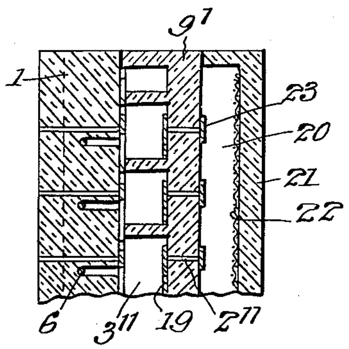
Fig. 9 represents a vertical section of a collective amplifier with luminous gas chamber.

Fig. 9 shows the case of a plurality of currents coming from the collective amplifier through a plurality of electrodes emerging in a flat chamber adjacent to the amplifier and filled with a suitable gas which becomes luminous by the passing current or electric discharges.

Fig. 9 differs from Fig. 3 in that the plate 9′ in front of the plate 1 is of glass with linear conductivity and that the longitudinal cavities 3″ of the plate 9′ carry at their bottoms a plurality of deposited metal areas 19 separated from each other and each in a contact with a corresponding duct 2″. This duct terminates in a flat chamber with gas 20 formed at one side by the plate 9′ and at the other side by a glass plate 21. The inner surface of the plate 21 carries a collective anode 22 formed either of a transparent deposited metal, or, as shown in Fig. 9, by a fine current-conducting grid, the current passing between the anode 22 on the plate 21 and the filament 6 of the first plate 1. 23 are separate metal areas, each in a contact with a corresponding duct 2″ and forming multiple electrodes of the flat gas-filled tube. The dimension of these metal areas is a function of the gas used and conditions of its use.

Figure 10:
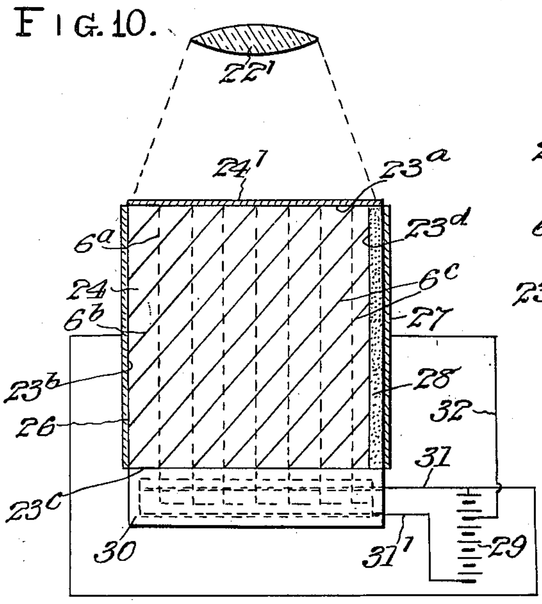
Fig. 10 represents a section through a visible image amplifier.

Fig. 10 shows an arrangement for amplifying vision images by means of a collective amplifier of the above described type. The photoelectric variations of the image to be transmitted are produced by a very thin layer of selenium mounted in a "resistance," and are transmitted to the collective amplifier by a body with linear conductivity.

In this figure, 22′ is an objective suitably supported and projecting an image on a surface in which terminate a plurality of ducts $6^a$ of the body 24 with linear conductivity and comprises, for the same number of conductors, a double number of laminations of half thickness.

Figure 11:
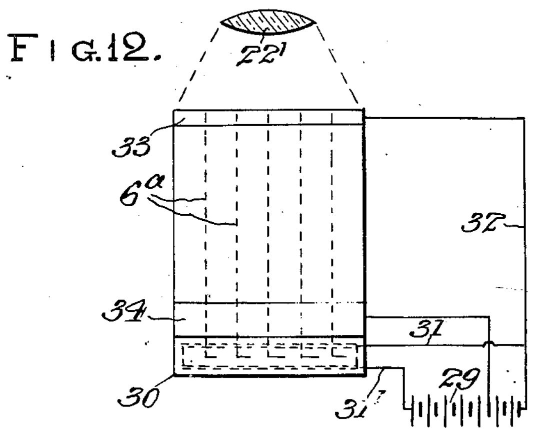
Fig. 11 represents a perspective view of a block of material used in the amplifier of Fig. 10.

Fig. 11 shows the construction of laminations of this body. 25 is a lamination of this body, having on one side or face the straight conductors $6^a$ passing from the edge $23^a$ to the edge $23^c$ in a contact with the amplifier. The opposite side of the lamination comprises inclined conductors $6^b$ at the edge $23^a$ and emerging at the edge $23^b$, and another group of inclined ducts $6^c$ extending between the edges $23^c$ and $23^d$. The edge $23^c$ comprises separated metal deposits $6^d$ joining, one by one, the ducts $6^c$ to the ducts $6^a$. The body 24 with linear conductivity (Fig. 10) is formed of a plurality of laminations 25, separated by laminations without any conductors. It is evident that all the conductors $6^b$ of all the laminations extend between the surfaces $23^a$ and $23^b$ of the body. Surface $23^a$, finely polished, is covered by a very thin layer of selenium 24′ for instance, by vaporization in vacuum. One common electrode 26 is applied to the face $23^b$, and another common electrode 27 is applied to the face $23^d$, but across a layer of common resistance 28 of very small thickness (less than the distance between the ends of the ducts $6^c$ at this side). The electrode 26 is connected with the positive pole of the battery 29 and the electrode 27 with its negative pole. Ducts $6^c$ are connected, as was described, with individual grids 7 of the collective amplifier indicated diagrammatically at 30.

The ends of the conductors $6^b$ at the surface $23^a$ are separated from the ends of the conductors $6^a$ (on the same surface) by a selenium layer. In lighted areas of the surface $23^a$ the local resistance is reduced, the potential of the corresponding grid 7 will become less negative, and the local current in the amplifier will be increased. This will produce, for instance, on a corresponding area of the fluorescent screen a brighter lighted spot.

The filaments of the amplifier 30 are diagrammatically represented by a conductor 31, and the anode at 31′. The method of heating of these filaments previously described is not shown on the drawing. A negative lead from the battery 29 is applied by a conductor 32 to the common electrode 27, and the current traverses in series the fixed resistance 28 and the variable resistance of selenium.

Figure 12A:
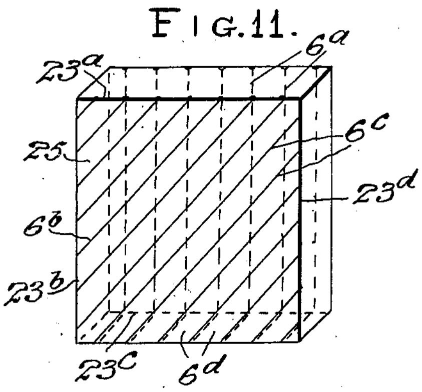
Fig. 12A represents a perspective view of a block of material used in the amplifier of Fig. 12.
Figure 12:
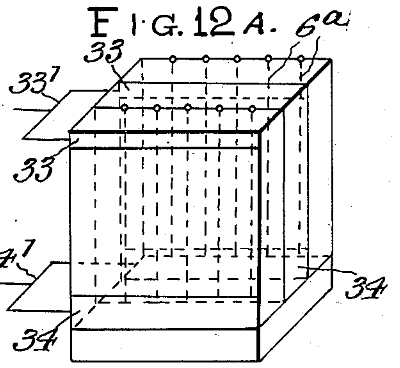
Fig. 12 represents a section through a simplified form of the amplifier shown in Fig. 10.

Fig. 12 shows a simplified modification of the arrangement of Fig. 10, using a body with linear conductivity shown in perspective in Fig. 12A.

In Fig. 12 the assembly of the conductors $6^b$ is replaced by a narrow metal band (or deposited metal) 33 joined together by a lateral electrode shown diagrammatically at 33', and emerging on the top surface covered by selenium, and the assembly of the conductors $6^c$ is replaced by larger bands 34 in contact at the side with a collective electrode shown diagrammatically at 34'. The conductors $6^a$ are deposited, for instance, on one side of the lamination, and the deposits in the form of bands 33, 34, on the other side.

The laminations forming this body have a controlled electric resistance (across their thickness), this resistance replacing the resistance 28 of Fig. 10. For this purpose the laminations are made of a plastic material (generally non-transparent) with relatively reduced transverse resistance, and the total resistance is varied by varying the surface area of the layers 34.

In the schematic Fig. 12, the distance between the upper surface, covered by selenium, and the surface applied to the amplifier, can be reduced to the minimum, the assembly representing a non-transparent plate on whose rear lower surface can be seen in an intensified light the image projected by the lens on the front upper surface.

Figure 13:
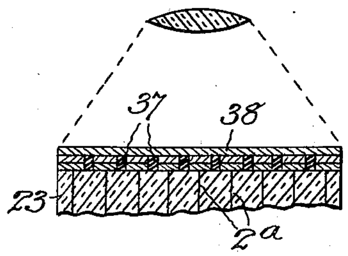
Fig. 13 represents, in section, a detail modification of the device of Fig. 12.

Fig. 13 shows a variation of Fig. 12 in which the selenium layer with longitudinal resistance is replaced by a selenium layer with a "transverse resistance" (either of selenium, copper oxide, or another layer used in photo-electric cells called "stopping layer").

Figure 14:
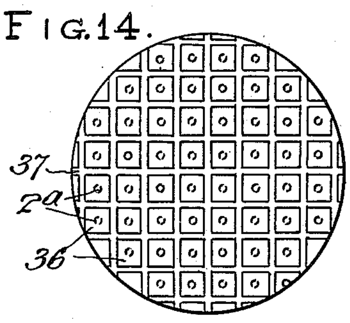
Fig. 14 represents a plan view of certain elements of Fig. 13.

In Fig. 13 is shown the image-receiving end of a block 23 with linear conductivity due to the ducts $2^a$. This end surface is metallized, for instance by a layer of copper which is then oxidized, forming a layer of copper oxide. The surface is subjected to suitable known treatments to render it photosensitive. Next, the copper deposit with the layer of copper oxide are cut so as to form a plurality of metal squares 36, shown in Fig. 14. The squares are insulated from each other, and each is in a contact with a respective conductor $2^a$. Next, the cuts are filled with a suitable insulating material 37, and a transparent metal layer 38 is deposited on the entire surface, connected by a conductor with the battery, as shown in the arrangement of Fig. 12. The layer 38 plays the part of the electrode 33 in Fig. 12.

This arrangement can be used in applying to the photosensitive cell a polarizing potential of a battery, conforming to the electrical scheme of Fig. 12, or else, the voltage variation generated by the cell itself may be used, leaving out the battery of polarization.

Figure 15:
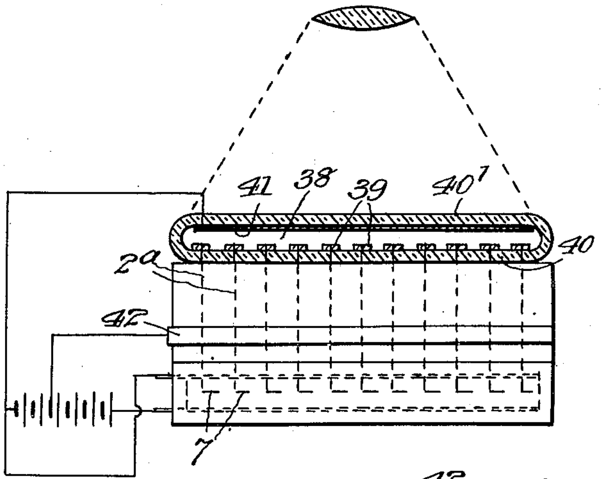
Fig. 15 represents a section of a modified form of visible image amplifier, with vacuum chamber.

Fig. 15 shows an important case of a conventional photosensitive layer functioning in a chamber 38 with a high vacuum. The photosensitive layer, for instance of cesium, as was previously explained, is cut into squares 39, individually in contact with ducts $2^a$ and which are deposited on a glass wall 40 with linear conductivity. Opposite the glass wall 40, on the wall 40' of transparent glass, is deposited a transparent metallic layer 41. The collective electrode 42 induces across the transverse resistances of the lamination a negative potential on the conductors $2^a$ and on the grids 7.

The image is projected on the mosaic of cesium squares 39. On the lighted image areas, a larger number of electrons is emitted from the cesium toward the anode 41. The corresponding grids become more positive, and the fluorescent screen (assumed to extend across the bottom of the apparatus shown) becomes more luminous. It is evident that a negative image can be obtained by covering with cesium the transparent layer 41 instead of the squares 39, and by inverting the polarity between 39 and 41.

The described system can be fed by an alternating current with a suitable and evident transformation of electric connections. The electrode 42 induces alternating charges in the conductors 6 across the transverse resistances of the laminations, which are supposed to have a definite and controllable conductivity.

The above described arrangements can be made in various suitable modifications of the mounting and arrangement according to the known art of mounting photoelectric cells and their amplifiers, in which essential elements such as photoelectric cells, electric conductors, capacities, electric resistances, and particularly leakage resistances for the grids, etc. exist although in a collective form and are rendered accessible.

Figure 16:
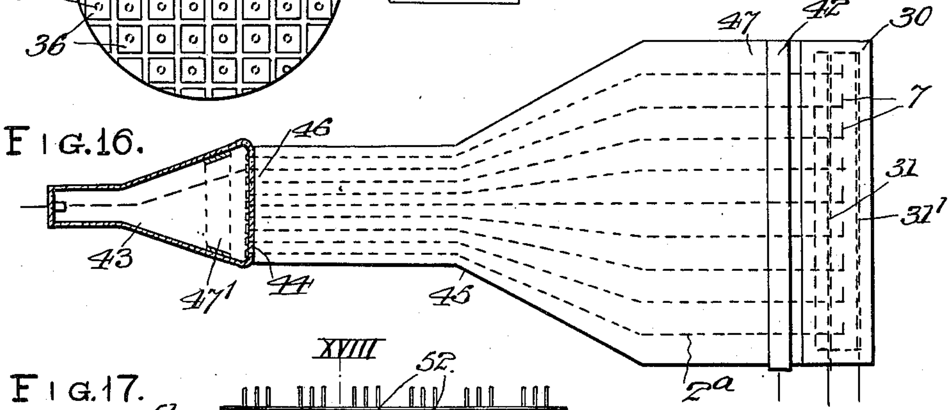
Fig. 16 represents a side elevation, partly in section, of a television image amplifier.

Fig. 16 shows diagrammatically the intensification and transposition on a large screen of an electronic image produced by the scanning beam of the television tube 43.

In this figure, 44 is a glass wall with a linear conductivity of the tube 43, exposed to scanning. The inner surface of this glass exposed to the scanning beam is covered by a mosaic of metallic squares as was explained with reference to Figs. 13 and 14. 45 represents diagrammatically a body with linear conductivity, of a plastic material, attached at its small end 46 to the tube and at its larger end 47 to the already described large collective amplifier 30. This collective amplifier is shown diagrammatically with the following elements; 7, grids; 31, hot filaments; 31', anode; 42, collective electrode of a metal band for the grid leakage current. Preferably, it is provided, especially in case of a body with linear conductivity of a complex or extended form or with sections of different size, to construct the plates or special surfaces, for instance, with a controlled transverse resistance or bands of "capacity" with electrical characteristics carefully calibrated and homogeneous, and to interpose such plates at one or the other final section of the body, so that the rest of the body could be made of an ordinary (and not controlled) material and could finally be submitted to considerable deformations without destroying the uniformity and constancy of the important electrical characteristics.

The scanning beam will charge the grids 7 negatively and consequently will produce on the fluorescent amplifying screen a negative image. Different methods are known, however, which make it possible to obtain a positive image. For instance, the surface exposed to the scanning beam can be covered by a material with abundant emission of secondary electrons, for instance, beryllium oxide, providing the tube with an electrode 47' for conducting the secondary electrons. Thus the sign of the electric impulse will also be changed. In regulating conveniently the potential of electrode 42, there will be obtained a positive image in the amplification. Scanning beams with slow electrons can be used, discharging the negative charges induced by the electrode 42. For obtaining the same result, special mountings of the amplifier are known.

It is particularly provided to obtain a very pronounced "storage" effect, imparting to conductors 6 suitable electric capacities, so that they could amass appreciable electric charges (for instance, by providing the bands 42, and, finally, also the conductors, with sufficiently large surfaces). The transverse leakage resistance of the laminations will be so regulated that the grids 7 will loose their electric charges in the time of the order of one "frame-period."

This system has an important application to the electronic tube oscillographs, and particularly to the radar oscillographs. Generally these oscillographs, of the screen size for instance of 10 inches, require only 30,000 picture elements, which is easy to realize in a collective amplifier of the same size forming the continuation of the electronic tube, with interposition between the tube wall and the amplifier wall of a plate with linear conductivity, for instance of conductive plastic material provided with interposed metallization layers insuring bias application and grid current leakage, or, in case the amplifier is larger than the tube, the body with linear conductivity can have the form shown in Fig. 16.

When the collective amplifier has also an image reproducing screen, the electrons are projected on a fluorescent layer covering the inner side of the exterior plate; a very high image brightness can be obtained by application between the filament and the anode of a sufficiently high voltage difference.

It is provided that the possibility of application of such high voltages on the micro-structure of the amplifiers can be secured by an arrangement in which the two plates are secured together at their edges, leaving a high vacuum chamber between the plates' surfaces supporting the amplifier elements. In this case it is provided that the first plate supports the filament and the grids, and the second the anode and the fluorescent screen. In order to obtain such plate surface separation in case of an amplifier of large linear dimensions the plates can be made sufficiently thick to resist the atmospheric pressure, or the plates can have a small curvature, or both. Such amplifiers may be applied, for instance, by eliminating the glass projections 10 (Figs. 2, 6, 8 and 9). Otherwise insulated spacing elements of minimum size may be provided.

It is evident that by application of such high voltages, combined with the use of the here described storage effect extending the fluorescence—or the gas luminescence—up to the total frame period (which duration can be prolonged at will), extremely high brightness permitting observation at full daylight can be achieved.

In the above described applications shown in Figs. 10, 12, 13, 15 and 16, the amplifier and image reproducer with luminescent gas shown in Fig. 9, can be used instead of the amplifier with fluorescent screen. The high positive voltage will be in this case applied to the anode 22 of the gas chamber.

Also the double amplifier of Fig. 8 can be used with corresponding known and evident modifications of the electric system. In this last case the intermediate plate 1' will be of the type with grid leakage resistance.

In a collective amplifier and image reproducer with for instance 200,000 picture elements, the size of each amplifier element controlling one picture element will be approximately 1 mm. for the 50 cm. size of the collective amplifier; 2 mm. for the 100 cm. size; 4 mm. for the 200 cm. size; and 8 mm. for the 400 cm. size. The minimum size of amplifier element practically realizable can be estimated at 0.5 mm., for a luminous reproduction screen of 25 cm.

That is, for an amplifier of 25 cm. size the glass plate with linear conductivity will be composed of glass sheets of 0.5 mm. thickness; and, if the plate itself is provided with leakage resistance, of sheets of 0.25 mm. thickness. The cuts on the inner glass surface of the plate (for filament and grid supporting element) may be made with a diamond saw of 0.1 to 0.3 mm. thickness; the tungsten wires for the filaments may be of the order of 0.01–0.02 mm. of diameter, which is completely in the scope of the present technique. Such fine tungsten wires, even when divided by the supports in lengths of, for instance, 0.4 mm. can be easily maintained at high temperature. For greater sizes of the amplifier elements the shaping will be less fine and easier to realize.

In the case of intensification and transportation of the image of vision, producing a plurality of simultaneous electric impulses potentially constituting the image, the use of the described system with a plurality of ducts whose number is equal to the number of the points or picture-elements of the image, is essential and indispensable. But in the case of television obtained by the succession of electric impulses, the invention provides a very important modification in which the same result can be obtained with a number of ducts between the television tube and the collective amplifier, equal only to $m+n$ where $m$ represents the number of picture points per line and $n$ represents the number of lines. This system includes a collective amplifier of the described type but with two sets of $m$ and $n$ grids, respectively, disposed at right angles to each other.

It is known to derive electric impulses from a receiving television tube, corresponding to points of the image along a line, for instance, deflecting the electronic beam by the line frequency synchronizing impulses, on a line of contact or, preferably, circularly, on a ring of contacts which traverse the wall of the tube, forming thus a "line frequency commutator." The electronic beam will be at the same time modulated in intensity, and the electric impulses coming from the tube, will reproduce the variations of intensity along a line, as a function of time and, successively, of all the lines during one frame-period.

In another tube the electronic beam can be deflected in a similar manner by the received frame frequency synchronizing impulses, forming thus a "frame frequency commutator." Impulses coming from this second tube will have a constant intensity, the duration of the impulse of each successive contact being of the order of the period of one line.

According to the present invention, the succession of the $m$ contacts coming from the first tube is placed one by one in electric communication with the succession of $m$ grids, located, for instance, vertically and running along the above mentioned collective amplifier, which is also supposed to be placed in a vertical plane. Each contact of this tube is therefore in individual communication with the corresponding vertical grid of the collective amplifier. "Leakage resistors" R of suitable values are provided, grounding the grids and their ducts. The resistors are preferably so calculated that charges remain on the grids approximately during the period of one line.

On the other hand, the succession of the $n$ contacts from the second tube are placed in electric communication with the succession of the $n$ grids of the electric amplifier disposed, for instance, horizontally, each contact of the second tube being in individual contact with the corresponding horizontal grid of the collective amplifier.

Figures 17, 19:
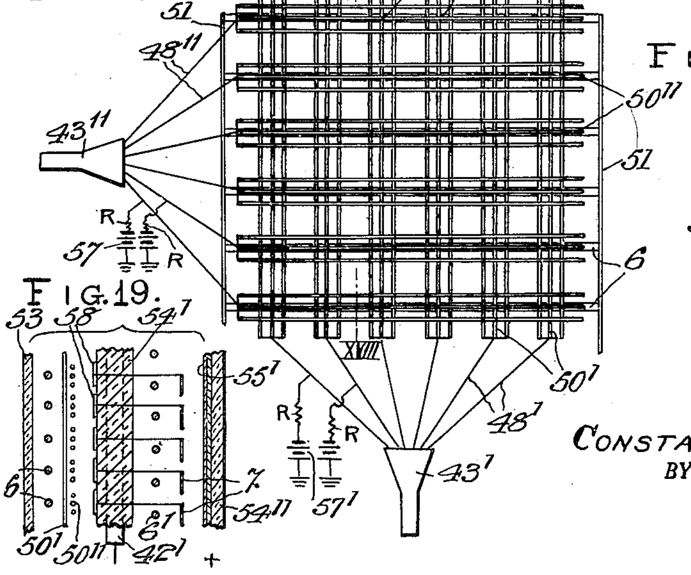
Fig. 17 represents a detail plan view of a coordinate system of electron control.
Fig. 19 represents, in section, a multiple form of the arrangement shown in Fig. 18.

Fig. 17 represents diagrammatically the operation of such a system.

In this figure 43' is the first television tube, 48' are ducts connecting contacts from the tube 43' with the vertical grids 50' of the collective amplifier, 6 are filaments (incandescent) of the collective amplifier, 51 are elements supporting the filaments, 43'' is the second television tube, 48'' are ducts connecting contacts in the tube 43'' with horizontal grids 50''. The incandescent portions of the filaments are located at the crossing points 52 of the grids.

Figures 18, 18A:
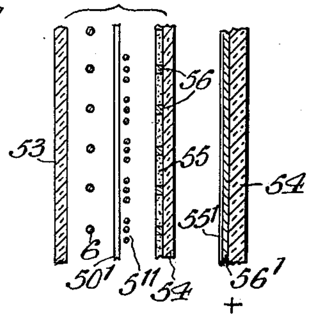
Fig. 18 represents a diagrammatic detail section, taken on the line XVIII—XVIII of Fig. 17.
Fig. 18A represents, in section, a modified detail of the arrangement shown in Fig. 18.

Fig. 18 is a schematic cross section view showing the relative positions of the elements of Fig. 17. In this figure, 53 is a wall or glass plate of the collective amplifier, 6 are filaments, 50' and 50'' are two groups of crossed grids located at a small distance from each other, 54 is the second transparent wall of the amplifier through which the image is observed, 55 is a layer of a fluorescent material covering the inner surface of the wall 54, and 56 are grids forming the anode. The two walls are joined at their periphery, forming a vacuum chamber.

Fig. 18A shows a detail variation of Fig. 18 in which the anode consists of a thin transparent metallic layer 56' deposited on the glass 54 the phosphor 55' being deposited—preferably in the form of a slightly discontinuous layer—on this metallic layer.

The operation is as follows: When one of the crossing grids is negatively charged, it will stop the passage of electrons and will extinguish the fluorescence of the screen in front of the crossing 52 of the two grids. Grids 50'' are held under suitable negative potential, for instance, by the battery 51 whose positive pole is grounded, and the negative pole is connected across high individual resistances with conductors 48''. The stream of electrons is cut off and the fluorescent screen is dark. The surface of the tube 43'' exposed to scanning is covered by a material favoring the emission of the secondary electrons. Under such conditions the beam of electrons will successively send positive impulses on the grids 50'' which will deblock, or render potentially transparent, the horizontal lines of the screen.

The vertical grids 50' held similarly under negative potential by the battery 57' receive from the tube 43', which also has a layer of emission of secondary electrons, successive positive impulses, which will modulate the flow of electrons at the successive points of the deblocked horizontal line, reproducing on the screen a "positive" fluorescent image of this line. As a result, during one frame period, there is reproduced a positive image, enlarged and amplified, of the image being reproduced.

This image is reproduced on the screen by the succession of points of instantaneous light emission, and each point must have great brilliance for rendering the image visible on a large screen.

But according to the invention, it is provided to produce—also in this kind of amplifier with $m+n$ ducts—an image of an almost continuous brilliance for each point of the image. For this purpose two collective amplifiers are mounted in series as shown diagrammatically in transverse section in Fig. 19.

The first of these amplifiers differs from the one in Fig. 18 in that the wall 54' in front of the grids is of a material with linear conductivity, and that its surface oriented toward grids 50' and 50'' is covered by a plurality of separate metal plates 58 in a contact through respective ducts with suitable separate grids 7 of the second amplifier. This second amplifier is formed by the same plate 54' (supporting grids 7 and filaments 6'), and by a third plate of transparent glass 54'' in front of the plate 54'. The anode is formed by a transparent metallic layer deposited on the plate, and a fluorescent layer is deposited on this transparent metallic layer, as in Fig. 18A.

Originally the horizontal grids 50'' of the first amplifier are maintained, as in the preceding case, under negative potential, blocking the passage of electrons, but the vertical grids 50' are maintained at a positive potential, or zero, not blocking the electrons. As in the preceding case, the tube 43', having a surface of emission of the secondary electrons, sends positive impulses which successively deblock the horizontal lines. On the other hand, the tube 43' does not have a deposit of the secondary emission and sends to the grids 50' negative impulses tending to reduce the flow of electrons, and which transmit to the corresponding plates 58 an inverted modulation. This inverted electric modulation, transmitted to the grids 7 of the second amplifier, produces a positive image on the fluorescent screen 55' of the second amplifier.

Figure 20:
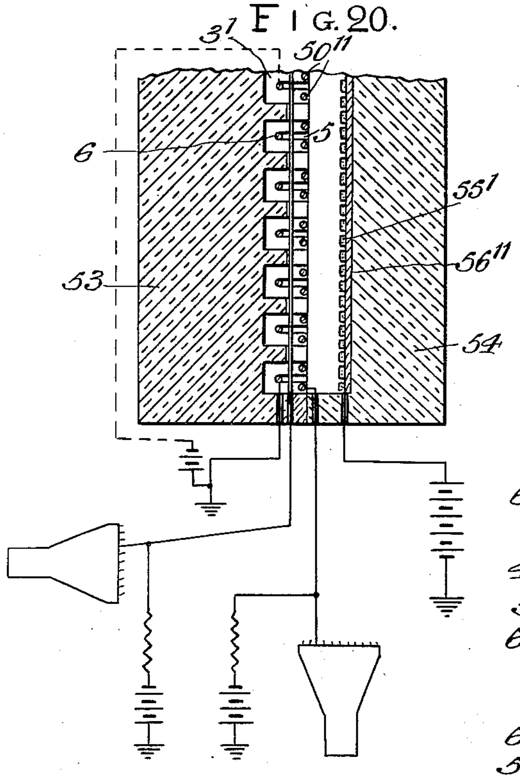
Fig. 20 represents a vertical section through a collective amplifier of the type shown in Fig. 17, with certain added features.
Figure 21:
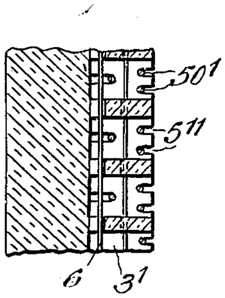
Fig. 21 represents a detail horizontal section of the device shown in Fig. 20.
Figure 22:
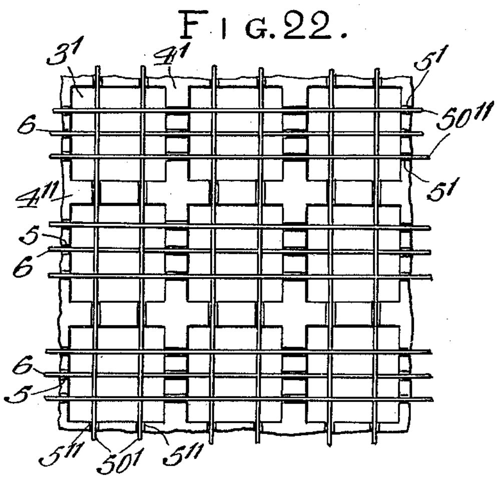
Fig. 22 represents a detail elevation of the grid-bearing face of the plate 53 in Fig. 20.

Fig. 20 shows a collective amplifier and reproducer system similar to that of Figs. 17, 18 and 18A in which the interior surface of the plate 53 comprises cavities 3' of rectangular form as shown in plan in Fig. 22. The remaining partitions 4' and 4'' between these rectangular cavities contain grooves supporting the filaments and the crossing grids. Thus the partitions 4' support the horizontal grid wires 50'' fixed in the shallow grooves 5'; and the partitions 4'' support the vertical grid wires 50' fixed in the grooves 5''. The filaments 6 are fixed in the grooves 5. The second plate 54 contains the collective anode 56'' and fluorescent layer 55'. Fig. 20 shows also a possible electric system of connection which is self-explanatory, but can vary in details conforming to the known amplifier technique.

In Fig. 20 the opposed interior surfaces of the plate are separated by a high vacuum space which permits the application of high voltage between the collective filament 6 and the collective anode 56''.

Figure 23:
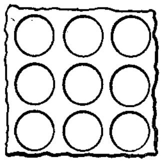
Fig. 23 represents a detail elevation of a plate having cylindrical cavities instead of the square cavities shown in Fig. 21.

Fig. 23 shows schematically a cylindrical form of cavities.

Figure 24:
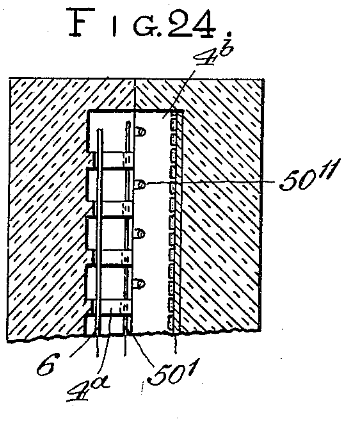
Fig. 24 represents a vertical section of a modified form of amplifier in which certain grid wires are supported on the second plate.

Fig. 24 shows a variation, in which the first plate has horizontal projections $4^a$ supporting the filament and the vertical grids 50'; and the second transparent plate has vertical projections $4^b$ supporting the horizontal grids 50''. The projections $4^a$ and $4^b$ are at right angles to each other and can be mutually applied in crosspoints.

Figure 25:
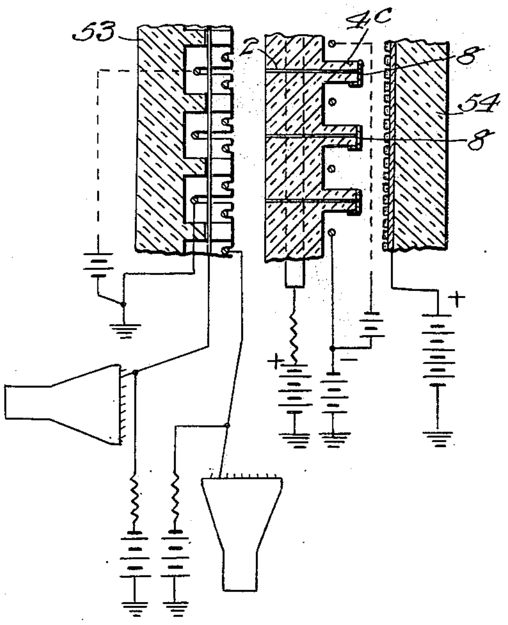
Fig. 25 represents an amplification of the structure shown in Fig. 19, with additional details of the wiring system.

Fig. 25 is similar to Fig. 19 and shows the mode of support of filament and grids. The first plate is similar to that of Fig. 20 and contains rectangular cavities; the intermediate plate is similar to that of Fig. 19 and has projections $4^c$ which can be longitudinal or simply linear and contain the ducts 2 and the metallic grid deposits 8, slightly extending over the lateral sides.

As was explained, the plate 54' is of a material with linear conductivity. To obtain the desired effect, this plate is made of laminations with controlled transverse resistance and with metal capacity bands 42' as was explained above, thus increasing the electric capacity of the leads and assuring a "leakage" current across the transverse resistance of the laminations.

To reduce the thickness of the intermediate plate 54', laminations are used with low transverse resistance and with high capacity of the ducts. The plate can be formed of several juxtaposed parts.

Figure 26:
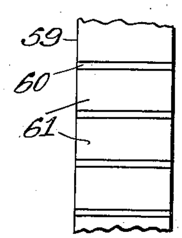
Figs. 26 and 27 represent, respectively, front and back views of a high-capacity plate element.

A special technique is provided for obtaining such a plate with large capacity of leads as shown in Fig. 26. According to this technique, the surfaces of the laminations 59 carrying the conductors, can be covered with continuous metallic deposits, and the separate ducts can be obtained by a plurality of separate lines 60 extending from one edge to the other and cutting these continuous deposits into separate bands 61 as shown in Fig. 26.

Figure 27:
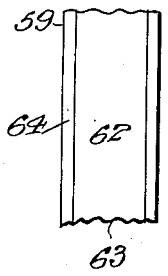

Fig. 27 shows the opposite side of the lamination 59 covered by a continuous band 62, extending perpendicularly to the bands 60 and emerging at the edge 63. Narrow edges 64, free from metal, extend along each side of the bands 62. The cuts 60, cutting or removing the metal, can be made, for instance, by a suitable tool. The alternate superposition of the laminations 59, with the laminations devoid of any deposits, forms the body 54'. Soldering or cementing of the laminations fills the lines 60 with insulation. (It is understood that the same body can be formed of laminations having only one side metallized, the other being bare, these laminations having alternately the deposit of Fig. 26 and the deposit of Fig. 27.)

The laminations with the same structure of deposit with narrow lines, separating the narrow bands of metallization, can, generally, be used for making the body with linear conductivity, particularly permitting to obtain conductors with low resistance.

Figure 28:
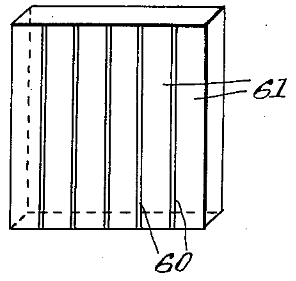
Fig. 28 represents, in perspective, a single lamina of a body with linear conductivity.

Fig. 28 shows such a lamination. This construction of the ducts can be used with considerable advantage for assuring the security of the electrical connections between the ends of corresponding ducts when the sections of two such bodies are juxtaposed.

Figures 29, 30, 31, 32, 33:
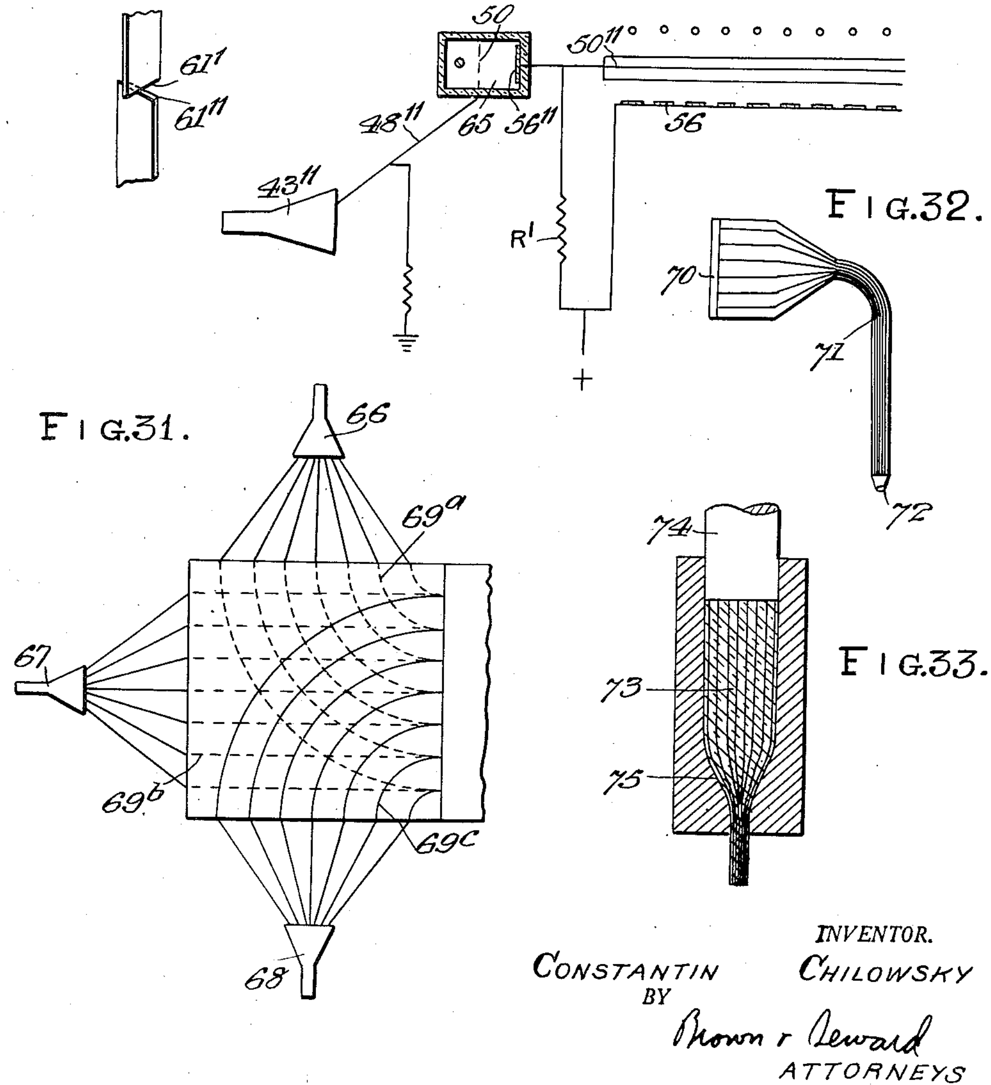
Fig. 29 represents, in perspective, the point of meeting of two laminae.
Fig. 30 represents diagrammatically a form of television image amplifier.
Fig. 31 represents an elevation of a color television unit.
Fig. 32 represents a side view of a body with linear conductivity having a part with reduced cross-section.
Fig. 33 represents, in section, one form of device for making the body shown in Fig. 32.

In such a case, as shown in Fig. 29, the laminations of one body should be in planes perpendicular to the laminations of the other body so that the two ends 61', 61'' of the emerging conductors will cross each other, and the electric contact obtained by such crossing will exist even in the case of an approximate adjustment of the ducts. It is also possible to use narrow ducts with large ends.

Because of the accumulation of the electric energy which is possible in an intermediate plate 54', made as described with increased capacity of the conductors, the duration of the fluorescence of each picture element can be made equal to the duration of the frame period.

This can be obtained by the appropriate selection of the transverse resistance of the laminations in such a manner that the time of disappearance of the electric charges from the grids will be equal to the frame period. (Of course, the disappearance of the grid charges, if necessary, can also be assured by other known means, for instance, by the emission of secondary electrons by the grids, by the presence of residues of the gas, etc.)

It is possible to obtain the same positive image with nearly complete frame storage period by using, for instance, three successive amplifiers. The first amplifier in the first described case, will produce a positive image but without storage. The second amplifier, applied according to the above described method, will produce a negative image, with almost complete storage, if the capacities of the ducts and the above explained leakage current are regulated. The third amplifier, applied under the same conditions, will produce a positive image with an almost complete storage.

The realization of the storage effect, extending over one frame period and assuring a quasi-continuous illumination of each point of the image, presents a considerable advantage, permitting to obtain, with relatively reduced voltage between the filament and plate, a very high brilliance, even with very large screens.

The same storage effect permits to obtain screens of great brilliance with flat chambers filled with luminescent gas, as described above, applied to the final collective amplifier with a positive potential image (the fluorescent areas being replaced in the final amplifier by metal plates).

The invention also provides for replacing, in the described amplifier with the negative image, the layers of a fluorescent material by crystalline layers of a sensitive salt producing, under the action of electrons, images of negative opacity. The inverted electric modulation in the amplifier will produce in these crystalline layers a positive image. The amplifier can be made almost completely transparent, by suitably polishing the glass. In these conditions, the projection of light through the amplifier and the layer of salt permits to make projection of a positive image through a suitable lens, on a large screen. The collective amplifier affords an important advantage in that it permits to furnish intense electronic currents at a reduced voltage which is essential for the formation of opacity on the salt. In this case, it is preferable to use amplifiers of a few decimeters square. Still greater advantages can be obtained, using a layer of crystalline salt in the amplifier with electric storage.

In the above described amplifiers, requiring two rows of $m+n$ conductors, the plates supporting the different elements of the collective amplifiers can be made of a material other than glass (for instance, of steatite, suitably degassed). In this case, the assembly of such plates and elements can be mounted in a double flat glass enclosure, sealed at the periphery, with two rows of conductors passing through the edges. Or, preferably, the conductors can be concentrated in glass bars with linear conductivity, joined integrally with the enclosure, and connected by the conductors with linear conductivity with the two television tubes.

In the above described systems of amplifiers, the negative impulses of the electronic beam were transformed, when necessary, into positive impulses in the electronic tube itself, by covering the contact exposed to the scanning beam, by materials with secondary emission. But the same result can be obtained, with certain advantages, by omitting the secondary emission material, and introducing into each duct between the tube contact and the grid of the collective amplifier (for instance, in the ducts 48'' or 48' of Fig. 17) an amplifier which may be called an "intermediate" amplifier.

Such a system is shown diagrammatically in Fig. 30. In this figure a duct 48'' transmits the negative impulses from the tube 43'' to the grid 50 of the intermediate amplifier 65, whose anode 56'' is connected with the corresponding grid 50'' of the collective amplifier of Fig. 17. The anode 56 of the collective amplifier and the anode 56'' of the intermediate amplifier are connected to the positive pole of the source of current, the anode 56'' being so connected through a resistance R' as to be under lower potential than the anode 56. In this manner, negative impulses from the tube being transformed into positive impulses in the intermediate amplifier, will deblock the flow of electrons, and render luminous the corresponding line of the screen (for instance, a horizontal line).

If the image comprises, for instance, 200,000 picture elements, the number of the intermediate amplifiers, for instance, for the horizontal lines of a square image, will be $\sqrt{m^n}$ or about 450.

It is preferred to make the intermediate collective amplifier with a single longitudinal row whose 450 separate anodes will be individually connected with the 450 grids of the principal amplifier and whose 450 grids will be connected with 450 contacts of the electronic tube. This linear and intermediate collective amplifier can be, for instance, placed in a cavity along the edge of the main amplifier, or, if necessary, can be outside the amplifier.

The plates constituting the collective amplifier can be prepared and shaped by any appropriate method and in any form, permitting the disposition and the support of essential amplifier elements: filament, grids, anodes, and, if desired, fluorescent layer. The glass surface can be shaped by cutting or molding, as seems most convenient. As mentioned, other elements than glass (for instance, degassed steatite, mica, etc.) can be used for constituting support elements, and a steatite plate can be used to constitute the interior, or even the exterior, wall.

Also, to conform to known amplifier technique, certain parts of the exterior envelope of the collective amplifier (of the type with $m+n$ ducts) can be of metal, the glass being used only for parts bearing the soldered amplifier electrodes, and for the exterior plate transmitting the light. The opposite exterior wall can be of metal, supporting for instance interior glass or steatite plates, or an assemblage of smaller juxtaposed plates.

For rendering the final image, intensified and greatly enlarged, strictly conforming to the electronic image transmitted by television, a special process of homogenization of the screen is provided, whose object is to remove possible small irregularities and differences of brilliance of the micro-areas of the luminous screen. For this purpose the screen is lighted, i. e. placed in operation, by transmitting an image of a clear background and of uniform brilliance. The brilliance of the successive points of the screen is controlled with the aid of one or several standardized photoelectric cells, and displacing these cells along the lines of the image. Each such cell is preferably mounted differentially with a standard stationary cell, suitably illuminated, the mounting being such that any excess of brilliance of one micro-spot of the screen is automatically translated by the closing of a relay (or other similar device) which controls a sprayer (for instance, operated by compressed air) which will spray a non-transparent paint. This sprayer is mechanically connected to the movable photoelectric cell, and follows its displacements, and will automatically deposit the paint on the corresponding micro-spots of the screen, reducing the transparency. The brilliance of each micro-spot is thus automatically reduced to the standard brilliancy required by the control cell. The spraying automatically stops when the standard brilliancy of the micro-spot is reached. The arrangement for the homogenization can be operated entirely automatically, and at high speed.

The described process also makes possible color television as is diagrammatically shown in Fig. 31.

In this figure 66, 67, 68 are three television tubes, one transmitting a partial image taken in red, the other an image taken in green, and the third, in blue. These tubes are applied to three surfaces of a body with linear conductivity having three separate conductivities, and three groups of conductors $69^a$, $69^b$ and $69^c$ transmit the corresponding electric impulses to a collective amplifier formed of a triple number of elementary amplifiers. Opposite these elementary amplifiers suitably spread out, is a triple number of anodic plates of a fluorescent material with three basic colors. Opposite the elementary amplifiers controlled by the impulses of the "red" tube, are placed red fluorescent spots and similarly, green and blue.

The red, green and blue points are no longer separable by the eye at a sufficient distance from the screen. Frosting of the screen accentuates this effect of the color fusion.

It is obvious that it is possible to obtain, according to the described principles, also television with amplifiers having rows of crossed grids. In place of the spots of fluorescent material of different colors, it is possible to use white fluorescent layer and to obtain the colors by a mosaic of small colored laminations applied to the screen, some passing the red, others the green, and the third ones, the blue.

Vision can be also realized in colors with 3 objectives of colored screens and 3 photosensitive layers.

Fig. 32 shows diagrammatically a device for medical purposes for examining cavities in the human body. 70 is a fluorescent screen, 71 is a collective conductor transmitting the image, and 72 is an "artificial eye" explained above.

Fig. 33 shows diagrammatically one of the phases of pressing a block 73 of a plastic material with linear conductivity, in order, for instance, to make a body represented in Fig. 32. 74 is a plunger which presses the material very slowly crosswise at 75, to a suitable contour. The deformation of the body can take place also by application at the surface of a plastic body with linear conductivity of appropriate rollers.

In the case of an electronic microscope, the real image of an object is projected by the objective of the microscrope on the terminal surface of the collective conductor 71 (Fig. 32), this surface being rendered photosensitive, as was explained. The projected image is rendered visible on a large screen, greatly intensified.

It is provided that in cases when a flat gas chamber containing a layer of luminescent gas is used as the final light generating and image reproducing screen, the flat gas chamber and the flat amplifier vacuum chamber are not necessarily applied to each other as shown, for instance, in Fig. 9, but can be at an appreciable distance from each other, remaining connected by a body of linear conductivity of a desired length. For instance in Fig. 9 the intermediate plate 9' can be imagined to be cut perpendicularly to the ducts, and an intermediary body with linear conductivity, if appropriate length and form, can be interposed. It is also provided that the amplifier and the gas chamber can be of different linear dimensions, for instance, the amplifier being of the small dimension of a television tube, and closely applied to the tube, and the gas chamber being of the great dimension of the luminescent screen. It is also provided that the flat gas or vapor containing chamber, not requiring the high vacuum, can be made of appropriate transparent plastic material, the intermediate body with linear conductivity forming directly one of the walls of the flat chamber.

The same consideration is applicable to the case when the amplifier is of the type with $m+n$ ducts, or in the case of a fluorescent screen—for instance Fig. 19—which could be separated from the first amplifier.

In the above description the amplifier and the light generation system were supposed to be fed by continuous electric currents, but it is evident that the alternating current can also be used with appropriate known modifications of the electric system.

Only fluorescent screens and luminescent gas screens have been mentioned above, but it is provided that the amplified currents of the collective amplifiers can be used to feed or control any other multiplicity of light emitting elements. In particular it is provided that the collective amplifier controlled by a television tube can be connected by a multiplicity of $m+n$ ducts with a large black filter screen constituting the final television screen, the amplified currents producing on the microfilm of the black filter positive or negative capacity images. Light projected through such black filter of great dimensions can give on the other side of the filter any desired brightness of image. These black filters of different types are described in the above mentioned application, Ser. No. 675,502.

Preferably, the amplifier in this case will be of small size and closely connected with the television tube, or incorporated in it, such amplifier being able to control a black filter screen of much larger dimension.

In an analogous way the collective amplifier controlled by the impulses of a photoelectric vision camera can be connected with a much larger black filter screen controlled by the amplified currents. This can be done not only to intensify invisible images, but also to control by a bright image of small dimension, a bright image on a very large screen. In particular, the image of a "movie" film can be projected on a small vision camera, the produced impulses controlling a small collective amplifier, the currents of which control a very large black filter screen. This makes possible, in particular, advertising vision and television with daylight image intensity.

It will be understood that various modifications can be made in the form, construction and arrangement of the several parts and in the steps of the method without departing from the spirit and scope of my invention, and hence I do not intend to be limited to the particular embodiment herein shown and described, but

What I claim is:

1. A television receiving system comprising, two cathode ray scanning tubes, at least two collective amplifiers arranged in series and adapted to reproduce by luminous picture points the image received, and a body with linear conductivity disposed between said amplifiers and comprising a body of material with controlled transverse resistance traversed by a plurality of $m \times n$ conductive ducts connecting points in one amplifier with points in another amplifier, one of said tubes being adapted to serve as a frame frequency commutator and having its points connected to $m$ elements in the first amplifier, and the other tubes being adapted to serve as a frame frequency commutator and having its points connected to $n$ elements in the first amplifier, $m$ representing the number of picture points per line and $n$ representing the number of lines.

2. A system according to claim 1 in which the body with linear conductivity is provided with a grid leakage resistance electrode, whereby storage of picture point impulses in the respective ducts may be effected.

3. In an apparatus of the character described, a flat vacuum chamber with a transparent wall, having a transparent electrode on the internal surface of said transparent wall, a layer of electron-emitting photosensitive material on the opposite internal surface of said chamber to constitute an image receiving surface, said layer being divided into picture elements, amplifier grid elements outside said chamber and corresponding to said picture elements, and a body with linear conductivity provided with a grid leakage resistance collective electrode, each picture element being operatively connected through said body with a respective amplifier grid element.

4. In an apparatus of the character described, an electronic tube having means for scanning one wall thereof, an image-receiving surface including a multitude of separate conductive areas each corresponding to a picture point of the image to be reproduced, deposited on the inner surface of said wall, amplifier grid elements outside of said tube and corresponding to said picture elements, the said wall constituting a body with linear conductivity, each said area being in communication through said wall with a corresponding amplifier grid element, and said apparatus including a grid leakage means adapted to ensure storage of electric impulses for a length of time approximating the scanning frame period.

5. An apparatus according to claim 4 in which the grid elements are disposed over an area larger than the image-receiving surface.

CONSTANTIN CHILOWSKY.

REFERENCES CITED

The following references are of record in the file of this patent:

UNITED STATES PATENTS

| Number | Name | Date |
|---|---|---|
| 1,477,094 | Wilson | Dec. 11, 1923 |
| 1,589,898 | Reeves | June 22, 1926 |
| 1,999,137 | Flewelling | Apr. 23, 1935 |
| 2,013,162 | McCreary | Sept. 3, 1935 |
| 2,109,339 | Nicolson | Feb. 22, 1938 |
| 2,120,765 | Orvin | June 14, 1938 |
| 2,176,225 | Ogloblinsky | Oct. 17, 1939 |
| 2,212,249 | Schroter | Aug. 20, 1940 |
| 2,220,688 | Schroter | Nov. 5, 1940 |
| 2,290,651 | Peck | July 21, 1942 |
| 2,313,286 | Okolicsanyi | Mar. 9, 1943 |
| 2,330,172 | Rosenthal | Sept. 21, 1943 |
| 2,375,272 | Barry | May 8, 1945 |

FOREIGN PATENTS

| Number | Country | Date |
|---|---|---|
| 315,362 | Great Britain | Feb. 12, 1931 |

Certificate of Correction

Patent No. 2,500,929 March 21, 1950

CONSTANTIN CHILOWSKY

It is hereby certified that error appears in the printed specification of the above numbered patent requiring correction as follows:

Column 22, line 8, for the word "tubes" read *tube*;

and that the said Letters Patent should be read with this correction therein that the same may conform to the record of the case in the Patent Office.

Signed and sealed this 27th day of June, A. D. 1950.

[SEAL]

THOMAS F. MURPHY,
*Assistant Commissioner of Patents.*